Patented Dec. 15, 1942

2,305,368

UNITED STATES PATENT OFFICE

2,305,368

PROCESS FOR THE MANUFACTURE OF IMPROVED TITANIUM DIOXIDE PIGMENTS

Robert K. Whitten, Wilmington, Del., assignor to E. I. du Pont de Nemours & Company, Wilmington, Del., a corporation of Delaware No Drawing. Application March 31, 1939, Serial No. 265,144

9 Claims. (Cl. 23—202)

This invention relates to the art of titanium dioxide pigments. More particularly it relates to the manufacture of titanium dioxide pigments of improved whiteness and brightness. Still more particularly it relates to a novel means for the removal of tenaciously held color imparting impurities from precipitated titanium dioxide comprising pigments.

Titanium dioxide pigments are conventionally precipitated from titanium sulfate solutions prepared from the reaction product of a titanium ore, such as ilmenite, and sulfuric acid. Titanium ores employed commercially in the production of titanium pigments contain iron in large proportions and minor amounts of other impurities, the most objectionable, because of their adverse effects on color, being chromium and vanadium. These impurities present in the ore dissolve in the sulfuric acid used to attack the ore and are carried through to the titanium sulfate solution from which titanium dioxide is precipitated. The commonly employed method of precipitation entails hydrolysis at elevated temperatures of the aforementioned titanium sulfate solution. The hydrolysis supernatant liquor is a relatively strong sulfuric acid solution containing upward to 300–400 grams $H_2SO_4$ per liter, appreciable quantities of ferrous sulfate, and lesser amounts of other salts such as aluminum, chromium, and vanadium sulfate. Under such conditions, viz. strongly acid solutions, it would not normally be expected that the minor amounts of chromium and vanadium present in the solution would be absorbed or adsorbed sufficiently by the titanium precipitate to adversely affect the color of the resulting pigment. However, by careful investigation I have established that the presence of such small amounts as 0.002% on the precipitated pigment depreciates the color to a noticeable extent when said precipitated pigment is calcined to provide a titanium dioxide pigment.

I am aware that it has been proposed to employ dilute acid washes for titanium precipitates. For instance, U. S. Patent 1,846,188 discloses a process whereby precipitated titanium dioxide is digested in weak acid in the presence of an oxidizing agent. Furthermore, U. S. Patent 1,885,187 discloses a process which comprises subjecting precipitated titanium dioxide to the action of a dilute acid and a reducing agent. Alternative acids such as hydrochloric acid, hydrofluoric acid, sulfuric acid and nitric acid are alleged to be satisfactory, and I have found that dilute sulfuric acid has some beneficial effects on color but that is apparently due to the removal of iron, which is generally present in much larger proportions than other impurities, and to a modification of the particle structure of the titanium precipitate.

This invention has as an object the economical production of high tinting strength titanium dioxide pigments of appreciably improved brightness and color as compared with the heretofore attainable pigments. A further object is the economical production of titanium dioxide pigments of increased purity. A still further object is the economical production of titanium dioxide compositions of extremely low chromium and vanadium content, appreciably lower than obtainable by prior art processes. Additional objects will become apparent from a consideration of the following description and claims.

These and other objects and advantages are attained according to the herein described invention which broadly comprises digesting hydrolytically precipitated titanium dioxide in the presence of sulfuric acid having a concentration between about 75 grams and about 550 grams $H_2SO_4$ per liter.

In a more restricted sense this invention comprises digesting hydrolytically precipitated titanium dioxide in the presence of sulfuric acid having a concentration between about 125 grams and about 400 grams per liter.

The preferred embodiment of my invention comprises taking an uncalcined hydrolytically precipitated titanium dioxide composition after it has been well washed to remove the supernatant liquor and the dissolved impurities, and to suspend such titanium composition in sulfuric acid having a concentration of between about 200 and about 300 grams per liter. The suspension is heated to an elevated temperature, preferably to the boiling temperature and so maintained for about an hour or more during which time a part of the titanium dioxide precipitate dissolves and substantially all of the chromium and vanadium compounds originally adsorbed on the titanium dioxide are rendered soluble. The suspension is then diluted with water to provide an aqueous solution comprising not more than about 250 grams, and preferably not more than about 200 grams $H_2SO_4$ per liter, after which the suspension is maintained at an elevated temperature, preferably at boiling temperature, for an hour or more and is then filtered (intermediate cooling is usually practiced, but is not necessary) and washed to remove the acid and the therein contained impurities. The product can then be calcined by processes well known in the art.

For a better understanding of the characteristics of the titanium dioxide pigments of this invention, it will be necessary to explain the various terms used herein and the methods of testing employed.

COLOR

Color is the apparent brightness and tint of the pigment in an oil paste as measured relative to a standard similarly prepared, and is expressed in units on an arbitrary scale.

The pastes are prepared by mulling the pigment with acid refined linseed oil of acid number 12.5 to form a thick paste. The sample to be tested and the standard are placed beside each other on a colorless microscope slide 2″ x 3″ in daubs about 1½″ x 1″. The daubs should be in sharp contact, without air bubbles, in the contact line and should be sufficiently thick to cut off all transmitted light. The pastes are then graded under north sky light for differences in appearance. The minimum perceptible difference in brightness is called one point of color. The sample is graded in full points from the standard. Differences in tint are important. In the case of white pigments, a yellowish cast of the sample is penalized in the grading to the extent of 1 or more points as is barely perceptible or clearly evident. On the other hand, a bluish cast relative to the standard is desirable and consequently modifies the brightness grading upward. This procedure is essentially the one described by J. E. Booge and H. E. Eastlack in "Paint, Oil and Chemical Review," April 9, 1924.

Pigments suitable for use in high quality white paints should have a color grading of 18 or higher on the arbitrary scale of the above color test.

TINTING STRENGTH

Tinting strength is the measure of the effectiveness of a white pigment in covering up the tint of a colored pigment mixed with it, and is also a measure of the hiding power of a pigment in an enamel type paint formulation. The property is relative in nature and results are obtained in comparison with another pigment used as a standard. These results depend on the standard for magnitude but are independent of the standard for relative order.

Pastes are prepared by mulling together titanium dioxide pigment, ultramarine blue, and acid refined linseed oil of 12.5 acid number for 3 minutes with a 15 pound weighted muller; 30 grams of titanium dioxide pigment are mulled with 1.0 gram of ultramarine blue and 1.5 c. c. of oil.

Standards are prepared in the same manner except for the amount of blue which is increased or decreased proportionately as it is desired to prepare standards of lower or higher strengths. The standard pigment employed in testing the herein described pigments was a standard titanium dioxide pigment having a tinting strength of 152.

The sample paste is graded through a glass microscope slide between standards of higher and lower strengths (i. e., less or more deeply tinted), and not more than 5% apart in strength. The proportion of blue used in the standard paste to give any desired strength is inversely proportional to that strength. Thus, one standard is called arbitrarily 152 which corresponds to 1.0 gram of blue in the paste. The blue required to give 147 strength is $$\frac{152}{147} \times 1.0$$

The above method is similar to that described by J. E. Booge and H. E. Eastlack in "Paint, Oil and Chemical Review," April 16, 1924.

Having explained the terms used herein I will now proceed with a detailed description of my invention.

I have discovered that prior art washing processes fail to remove the chromium and vanadium from hydrolytically precipitated titanium dioxide pigments because such impurities are held so tenaciously that in order to effect their removal the surface layer of the titanium pigment particles must also be dissolved. In other words, my process requires that some of the titanium precipitate must be dissolved in order to effectively remove such impurities as chromium and vanadium and to realize the improved pigment color thus attainable. Prior art washing processes, such as washing with dilute acid in the presence of a reducing agent or in the presence of an oxidizing agent, do not effect this solution of the surface layer of the precipitated titanium oxide particles, and hence do not provide titanium dioxide pigments of greatly improved color and brightness.

My digestion process differs from the prior art teachings in that I dissolve a portion of the titanium dioxide and this is specified as a fundamental requirement of the process. However, it is to be understood that my process should be conducted in such a manner that only a minor proportion of the titanium dioxide is dissolved. In no instance should more than about 15% of said oxide be dissolved and for optimum effects the titanium dioxide should not be solubilized to an extent greater than about 1.5%.

As mentioned above, the treatment is made for the purpose of removing color imparting impurities such as chromium and vanadium compounds, for example, oxides or hydroxides which are adsorbed on the precipitated titanium dioxide. I have found that these objectionable chromium and vanadium compounds can not be removed by acids of such concentrations that fail to dissolve a portion of the titanium dioxide. It is highly probable that the impurities are held on the surfaces largely by adsorption, and are simultaneously dissolved with the surface layer of the titanium dioxide. The amount of titanium dioxide dissolved will depend upon the strength of the acid used and will vary from about 0.6 to about 25 grams per liter in the range of acid concentration mentioned above (75 to 550 grams $H_2SO_4$ per liter) and will vary from about 1.8 to about 3 grams per liter in the preferred range of acid concentration, namely, 200 to 300 grams $H_2SO_4$ per liter.

The preferred suspension concentration is between about 200 and about 425 grams $TiO_2$ per liter, the upper limit being determined by the flowing characteristics. It is desirable that a definitely fluid suspension be maintained for agitation and transfer purposes, and while concentrations of 100 grams $TiO_2$ per liter or less can be employed, they are not recommended due to the large volumes to be handled. These preferred concentration conditions will result in a dissolving of from about .75 to about 1.5% of the titanium dioxide in the digestion process and the more drastic conditions are preferred and recommended when a less pure hydrolytically precipitated titanium oxide is being treated.

It is desirable that my digestion treatment should be effected at a temperature of at least about 80° C. Preferably, the digestion treatment should be effected at the boiling temperature (under atmospheric pressure) of the acid slurry, although in certain instances it may be conducted at temperatures above the boiling point, as under pressure in an autoclave. Digestion of the titanium dioxide slurry comprising $H_2SO_4$ in an amount in the range of from about 75 grams per liter to about 550 grams per liter should be conducted at a temperature of at least about 80° C. for a period of from about 1 to about 4 hours and preferably, for a period of from about 2 to about 3 hours. Thereafter, if the sulfuric acid concentration be in excess of from about 200 to about 250 grams H₂SO₄ per liter, said slurry should be diluted with water to provide an acid concentration of between about 200 grams and about 250 grams per liter. Thereafter, the pigment suspension is maintained at a temperature of at least about 80° C., and preferably at the boiling point, for an hour or more and preferably for a period of from about 3 to about 4 hours. The slurry is then filtered and washed, preferably after cooling, and the hydrated titanium dioxide thus obtained is calcined by procedures well known in the art and thereby converted to titanium dioxide pigment.

It is to be understood that in those instances where the acid digestion is conducted in an acid medium comprising in excess of from about 200 to about 250 grams H₂SO₄ per liter, it is desirable that the aqueous suspension should be diluted to provide an acid concentration of not more than about 250 grams per liter and preferably not more than 200 grams per liter and that the slurry so obtained should be maintained in a heated or boiling condition for some time thereafter. Otherwise, the titanium oxide dissolved in excess of about 1% will be lost, thus rendering the process economically less attractive. However, under the conditions hereinbefore stated, the dissolved titanium oxide in excess of about 1% of the total titanium dioxide pigment weight, reprecipitates on the surface of the titanium dioxide pigment particles as substantially pure titanium dioxide, thereby providing a good yield of extremely white titanium dioxide of excellent pigment properties. On the other hand, if sulfuric acid concentrations in excess of about 550 grams H₂SO₄ per liter be employed in my process, relatively large amounts of the precipitated titanium dioxide are dissolved, and, under particularly severe conditions substantially all of the precipitated titanium dioxide is dissolved. When an attempt is made to reprecipitate this dissolved titanium dioxide under the conditions hereinbefore disclosed, that is, by diluting with water and maintaining the diluted solution at an elevated temperature for a period of time, reprecipitation of the titanium dioxide is obtained with difficulty, if at all, and the precipitated titanium dioxide thereby obtained, even on subsequent calcination under carefully controlled conditions, provides a titanium dioxide pigment having inferior pigment properties. Moreover, even when said precipitation is conducted under optimum conditions, i. e., under the best hydrolysis conditions, relatively high losses of the titanium dioxide are unavoidable, thereby rendering such treatment economically impractical. Furthermore, the color and brightness properties and other pigment properties of the titanium dioxide pigment obtained by such redissolving and reprecipitating process are in no way superior to those of the titanium dioxide pigment products of the novel process of my invention.

In my digestion treatment I may add a reducing agent and this is especially desirable if the titanium dioxide pigment contains ferric iron. Thus, for example, I may add a trivalent titanium solution or more simply, powdered zinc. The presence of the reducing agent is not necessary for the removal of chromium and vanadium and is therefore not a vital part of this invention.

The invention may be more readily understood by a consideration of the following examples which are given for illustrative purposes and are not intended to impose limitations of any kind on the herein described invention:

Example I 300 gram samples of a hydrolytically precipitated filtered water-washed titanium dioxide (washed on the filter with water until its content of iron salts calculated as Fe was less than 0.1%), comprising 40% TiO₂ and 3.5% adsorbed H₂SO₄ by weight was slurried in water and in sulfuric acid of varying concentrations to provide pigment slurries comprising 286 grams TiO₂ per liter and, respectively, 10, 50, 75, 125, 200, 300, 400, 500, 550, 600, and 65 grams of H₂SO₄ per liter. The slurries were heated to boiling and maintained in a boiling condition for a period of 3 hours. Water was then added to those slurries having acid concentrations in excess of 200 grams sulfuric acid per liter in an amount sufficient to reduce the acid concentration to 200 grams H₂SO₄ per liter. Thereafter, all of the slurries were maintained at a boiling temperature for an additional 3 hours period, whereupon the suspensions were cooled, filtered, washed with water and calcined under identical conditions to provide samples of pigment titanium dioxide which were designated as samples A, B, C, D, E, F, G, H, I, J, and K, respectively. The percentage of titanium dioxide loss, i. e., % TiO₂ removed as soluble titanium in the filtrate in each instance was determined gravimetrically. Furthermore, the chromium and vanadium content of the titanium dioxide pigment samples obtained was also determined and said pigment samples were tested for color and tinting strength. In the following table are recorded the data thereby obtained:

| Pigment sample | H₂SO₄ g./l. | Percent TiO₂ loss | Milligrams Cr₂O₃ and V₂O₅ per kg. pigment TiO₂ | Color | Tinting strength |
|---|---|---|---|---|---|
| A | 10 | .01 | 100 | 15 | 153 |
| B | 50 | .09 | 98 | 16 | 152 |
| C | 75 | .25 | 5 | 20 | 154 |
| D | 125 | .35 | 3 | 21.5 | 153 |
| E | 200 | .83 | 2 | 23 | 151 |
| F | 300 | .81 | 2 | 23 | 152 |
| G | 400 | .85 | 2 | 22.5 | 150 |
| H | 500 | .95 | 2 | 22.5 | 153 |
| I | 550 | 1.25 | 1 | 22.0 | 150 |
| J | 600 | 10.90 | 1 | 21.5 | 141 |
| K | 650 | 30.40 | 2 | 21.0 | 122 |

It will be noted that pigment samples C to I inclusive, prepared by the novel process of this invention, had excellent color and tinting strength and were substantially free from chromium and vanadium impurities. Furthermore, said pigment samples were obtained without undue loss of TiO₂ during the acid purification process. On the other hand, pigment samples A and B, digested with dilute acid according to the processes of the prior art, were definitely inferior in color and comprised substantial amounts of chromium and vanadium compounds. Furthermore, pigment samples J and K, prepared by an acid digestion process employing higher concentrations of sulfuric acid than I have found useful, had good color but their tinting strengths were low and substantial proportions of TiO₂ were lost during the acid digestion process.

Example II

Hydrolytically precipitated filtered water-washed TiO2 was fed continuously to a repulping tank where a suspension containing 275 grams TiO2 per liter was produced. A stream of 60° Bé. sulfuric acid was also added at a rate that gave 0.75 lb. of H2SO4 per lb. of TiO2. This sulfuric acid containing slurry was continuously added to a vessel and maintained at a temperature between 90° C. and the boiling point of the liquor, and overflowed to a cooling tank at the same rate. After cooling, it was filtered and washed. The average retention time in the digestion tank was 3 hours. The pigment thereby produced was compared to an untreated control after calcination of both and an improvement of about 2% in reflectance was found. The method used for determining the reflectance is found in "Handbook of Colorimetry" by A. C. Hardy, Technology Press, Mass. Institute of Technology (1936).

It is to be understood that the specific embodiments of this invention may be varied without departing from the scope thereof. For instance, the process is not limited to the improvement of the color of substantially pure titanium dioxide pigment. It applies also to the improvement of composite products such as titanium dioxide precipitated in the presence of BaSO4, CaSO4, or other extenders, and the treatment of these compositions is within the scope of my invention.

As is evident from the above examples, my process is suitable for use in either a continuous or batch manner. I prefer, however, to wash the digested suspension on batch operation filters due to the more efficient washing thereby obtained. As previously stated, the use of a reducing agent in my process is optional but desirable when treating a slurry containing an appreciable amount of iron.

The improved titanium dioxide pigment, obtained by my novel process, has a color of from 20 to 23 when graded by the hereinbefore described pigment color test, whereas pigment made from ilmenite by identical treatment without my preferred acid treatment of the hydrolytically precipitated titanium dioxide is graded about 15. By the prior art dilute acid treatment it can be raised 1 point, viz. 16. However, when using my treatment an improvement of from 5 to 8 points results. This improvement is great enough to give my improved product a distinct advantage in paint, ink, paper, leather, and other commodities in which titanium pigments are employed.

I have found that other mineral acids cannot be substituted for sulfuric acid in my process. Hydrochloric, hydrofluoric, and nitric acid have been proposed as equivalent to sulfuric acid in the prior art processes. However, sulfuric acid alone has been found suitable in my process and my process is so limited.

The hydrolytically precipitated titanium dioxide may be produced by processes well known in the art. However, I have found it desirable to employ the processes described in U. S. Patent 1,851,487 and Reissue Patents 18,790 and 18,854.

The sulfuric acid solution recovered by the filtration of the digestion slurry will have approximately the same concentration as that used in the digestion. It will contain minor amounts of titanium, chromium, iron, and vanadium, but the amounts of these are very small compared to the amounts present in the ore. The acid is therefore suitable for use in further ore dissolving operations and while the amounts seem large (as much as 2 lbs. or more H2SO4 per lb. of TiO2 treated) the actual cost is not so great since it can be used to replace new acid in the preparation of solutions for hydrolysis. By a proper conservation of these acid solutions they can be largely recovered and when so reused, the total acid cost for the manufacture of the pigment will not be substantially greater than for prior art processes.

The supernatant liquid from my digestion treatment has been analyzed for chromium and vanadium and in some instances as much as 50 milligrams of these compounds expressed as $Cr_2O_3$ and $V_2O_5$ per liter has been found. The product from which these impurities have been extracted is superior in whiteness to the undigested control. Furthermore, if I add an amount of these compounds equivalent to that found in the sulfuric acid extraction and subsequently calcine this titanium dioxide, I again get a color comparable to that of the undigested control. These results lead me to the conclusion that the improvement is due in a large measure to the removal of such deleterious color imparting compounds.

The product from the hydrolysis of impure titanium sulfate solutions such as are prepared from ilmenite will contain as much as about 200 milligrams of chromium and vanadium compounds expressed as $Cr_2O_3$ and $V_2O_5$ per kilogram of titanium dioxide. The amount actually present will vary with the purity of the ore but I have never found less than 20 milligrams per kilogram of titanium dioxide. These products after digestion with acid in accordance with my process will contain less than 5 milligrams of the chromium and vanadium compounds expressed as $Cr_2O_3$ and $V_2O_5$ per kilogram of titanium dioxide.

Also, I have found that concentrations in excess of 75 grams H2SO4 per liter and preferably over 200 grams H2SO4 per liter are necessary for substantial removal of chromium and vanadium oxide from the hydrolyzed titanium product. Below this point ferrous iron is readily removed and such treatment has been practiced in the prior art. My process has been demonstrated to give as much as 3 or more percent increase in reflectance (tests made on the product after calcination) of the pigment, whereas the prior art treatment of 50 grams per liter or less give only about one sixth as much improvement on the same raw pigment which was almost completely iron free prior to the treatment. Analytical tests on the supernatant liquid and the extracted pigment have shown that only minor amounts of the chromium and vanadium oxide originally present remain in the pigment after my treatment, while no substantial reduction takes place with the prior art treatments.

The hydrolysis product from a titanium sulfate solution consists of titanium dioxide, hydrated titanium dioxide, and basic titanium sulfate, and I have used the term "hydrolytically precipitated titanium dioxide" in the foregoing disclosure to cover this composition and it is to be so interpreted in the appended claims.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for removing impurities from titanium oxide pigments, which comprises mixing precipitated, purified titanium dioxide recovered from titanium solution hydrolysis and containing adsorbed chromium and vanadium compound impurities with sufficient sulfuric acid to produce a filterable, substantially non-hydrolyzable $TiO_2$ suspension containing a total of $H_2SO_4$ concentration ranging from about 75 to about 550 g./l., digesting the resulting suspension at an elevated temperature ranging from about 80° C. to the boiling point for such period of time that said impurities are substantially removed from said $TiO_2$ and not to exceed about 15% of said $TiO_2$ becomes dissolved in the process, and then recovering and calcining the resulting purified $TiO_2$ product.

2. A process for removing impurities from titanium oxide pigments which comprises mixing an aqueous suspension of precipitated, purified, hydrolytically precipitated titanium dioxide recovered from titanium solution hydrolysis and containing adsorbed chromium and vanadium compound impurities with sufficient sulfuric acid to produce a filterable, substantially non-hydrolyzable $TiO_2$ suspension containing a total $H_2SO_4$ concentration ranging from about 125 to about 400 g./l., digesting the resulting suspension at an elevated temperature ranging from about 80° C. to the boiling point for such period of time that said impurities are substantially completely removed from said $HiO_2$ and not to exceed about 15% of said $TiO_2$ is dissolved in the process, and then recovering, washing and calcining the resulting $TiO_2$ product.

3. A process for removing impurities from titanium oxide pigments which comprises mixing an aqueous suspension of precipitated, purified titanium oxide recovered from titanium solution hydrolysis and containing adsorbed chromium and vanadium compounds as impurities with sufficient sulfuric acid to produce a filterable, substantially non-hydrolyzable $TiO_2$ suspension containing a total $H_2SO_4$ concentration ranging from about 75 to about 550 g./l., digesting the resulting suspension for a period ranging from about 1–4 hours at an elevated temperature ranging from about 80° C. to the boiling point, whereby said impurities are substantially completely removed from said $TiO_2$ and not to exceed about 15% of the titanium oxide under treatment is dissolved in the process, and then recovering, washing and calcining the resulting $TiO_2$ product.

4. A process for removing impurities from titanium oxide pigments which comprises mixing an aqueous suspension of precipitated, purified titanium oxide recovered from the hydrolysis of a titanium sulfate solution and containing adsorbed chromium and vanadium compounds as impurities with sufficient sulfuric acid to produce a filterable, substantially non-hydrolyzable $TiO_2$ suspension containing a total $H_2SO_4$ concentration ranging from about 125 to about 400 g./l., digesting the resulting mixture for at least one hour at an elevated temperature ranging from about 80° C. to the boiling point, whereby during said digestion said impurities are substantially removed from said $TiO_2$ and not to exceed about 1.5% of the $TiO_2$ under treatment is dissolved in the process, and then washing and calcining the resulting $TiO_2$ product.

5. A process for removing impurities from titanium oxide pigments which comprises mixing hydrolytically precipitated, purified titanium oxide containing adsorbed chromium and vanadium compounds as impurities with sufficient sulfuric acid to produce a filterable, substantially non-hydrolyzable $TiO_2$ suspension wherein a total $H_2SO_4$ concentration of between about 75 g. and about 550 g./l. prevails, digesting the resulting suspension at an elevated temperature ranging from about 80° C. to the boiling point for a period of at least one hour, whereby said impurities become substantially removed from said $TiO_2$ and not to exceed about 15% of the $TiO_2$ under treatment becomes dissolved in the process, thereafter maintaining the total sulfuric acid concentration of said suspension at not to exceed about 250 g./l., thence digesting the latter suspension for a period of at least one hour and at said temperature range, and then recovering and calcining the resulting $TiO_2$ product.

6. A process for removing impurities from $TiO_2$ pigments, comprising mixing an aqueous suspension of relatively pure, hydrolytically precipitated titanium dioxide containing adsorbed chromium and vanadium compounds as impurities with sufficient sulfuric acid to provide a filterable, substantially non-hydrolyzable suspension containing a total $H_2SO_4$ concentration of between about 125 g. and about 400 g. of sulfuric acid per liter, digesting the resulting mixture at a temperature between about 80° C. and the boiling point for a period of time between about one hour and about four hours during which digestion said impurities are substantially removed from said $TiO_2$ and not to exceed about 15% of the $TiO_2$ undergoing treatment is solubilized, thereafter maintaining the total sulfuric acid concentration of the suspension at not to exceed about 250 g./l., thence further digesting the suspension for a period of time between about one hour and about four hours at a temperature of at least 80° C., and then recovering and calcining the resulting $TiO_2$ product.

7. A process for removing chromium and vanadium compounds as impurities from $TiO_2$ pigments comprising mixing an aqueous suspension of relatively pure, hydrolytically precipitated titanium dioxide containing said impurities with sufficient sulfuric acid to provide a filterable, substantially non-hydrolyzable suspension containing a total $H_2SO_4$ concentration of between about 200 g. and about 300 g. of sulfuric acid per liter, digesting the resulting mixture for at least one hour at about the boiling point thereof while dissolving not to exceed about 1.5% of the $TiO_2$ under treatment, thereafter maintaining the total $H_2SO_4$ concentration of the suspension at not to exceed about 250 g./l. through water addition thereto, thence further digesting the suspension for at least one hour at the boiling temperature thereof, and then recovering, purifying and calcining the recovered $TiO_2$ product.

8. A process for removing chromium and vanadium compounds as impurities from $TiO_2$ pigments comprising mixing an aqueous suspension of relatively pure, hydrolytically precipitated titanium dioxide containing said impurities with sufficient sulfuric acid to provide a filterable, substantially non-hydrolyzable suspension containing a total $H_2SO_4$ concentration of from about 200 g. to about 300 g./l., digesting the resulting mixture for a period of time between about one hour and about four hours at the boiling point thereof, during said digestion dissolving not to exceed 1.5% of the $TiO_2$ under treatment, thereafter maintaining the total sulfuric acid concentration of the suspension at not to exceed about 250 g./l. and digesting the suspension further for a period of time between about one hour and about four hours at the boiling point thereof, and then recovering, purifying and calcining the resulting $TiO_2$ product.

9. A process for purifying a raw $TiO_2$ pigment precipitate to obtain an improved $TiO_2$ pigment therefrom on subsequent calcination, which comprises mixing an aqueous suspension of the previously washed, hydrolytically precipitated titanium dioxide containing adsorbed chromium and vanadium compounds as impurities with sufficient sulfuric acid to provide a filterable, substantially non-hydrolyzable $TiO_2$ suspension containing a total $H_2SO_4$ concentration of between about 200 g. and about 300 g./l., digesting the resulting mixture for a period of time between about two and about three hours at the boiling point thereof to solubilize and substantially remove said impurities from said $TiO_2$, during said digestion dissolving not to exceed about 1.5% of the $TiO_2$ under treatment, thereafter maintaining the total sulfuric acid concentration of the suspension at not to exceed about 250 g./l., digesting said suspension further for a period of time between about two hours and about three hours at the boiling point thereof, and then recovering, filtering, washing and calcining the resulting purified $TiO_2$ product.

ROBERT K. WHITTEN.

CERTIFICATE OF CORRECTION.

Patent No. 2,305,368.   December 15, 1942.

ROBERT K. WHITTEN.

It is hereby certified that error appears in the printed specification of the above numbered patent requiring correction as follows: Page 3, second column, line 16, for "and 65" read --and 650--; page 5, first column, line 28, claim 2, for "HiO$_2$" read --TiO$_2$--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.